May 13, 1930.  W. D. SHOEMAKER  1,758,130
ORNAMENTAL WALL FIXTURE
Filed Feb. 15, 1928
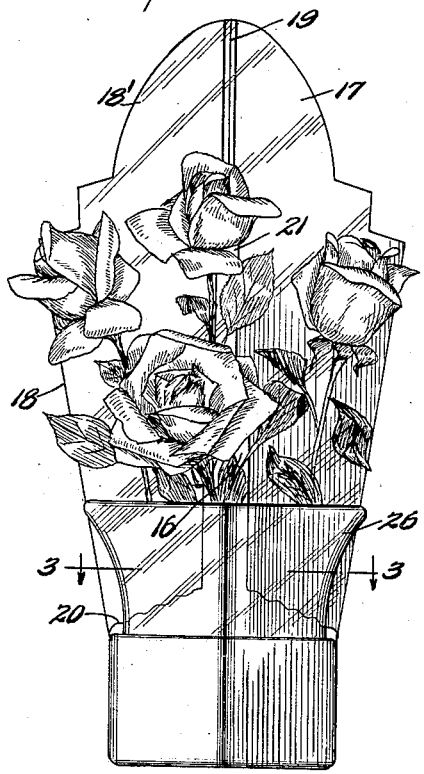
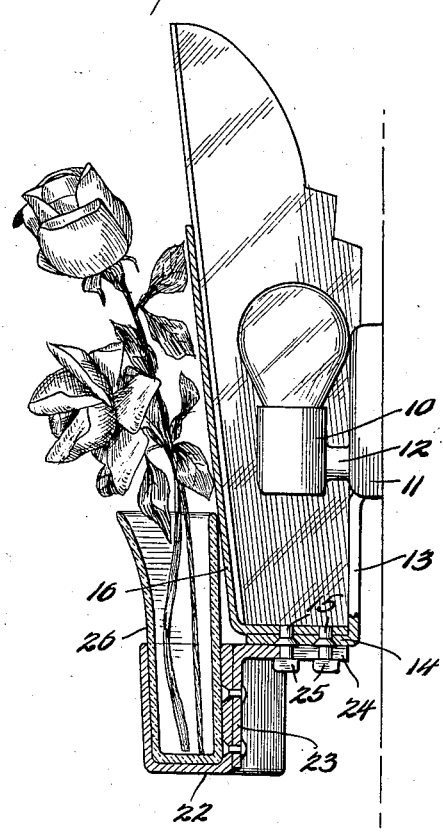
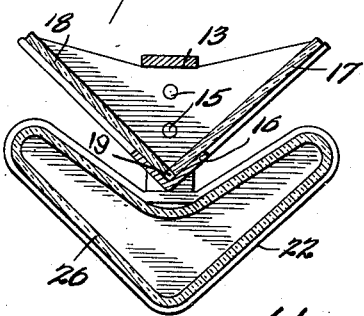
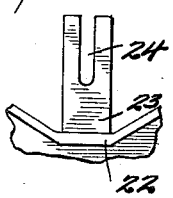
Inventor
Wm. D. Shoemaker Patented May 13, 1930

1,758,130

UNITED STATES PATENT OFFICE

WILLIAM D. SHOEMAKER, OF CHEVY CHASE, MARYLAND

ORNAMENTAL WALL FIXTURE

Application filed February 15, 1928. Serial No. 254,530.

This invention relates to ornamentation and more particularly to ornamental combinations of electric light fixture and flower holder.

The object of the invention is to produce a combination of the type described which will present a unique ornamental appearance in that flowers, natural or artificial, will be combined with an electric light fixture so that the coloring effect of the light passing through the flowers will produce a unique ornamental appearance.

Another object of the invention is to provide an association between the flower vase and a light fixture whereby the ornamental design of fixture will blend with the ornamental design of the vase and the flowers held by the vase brought into spaced relationship with the light that the effect of light and coloring of the flowers will be pleasing to the eye.

A further object of the invention is the provision of a flower holder in the nature of an attachment to a light fixture, in which the design of holder conforms to that of the light fixture, in such a way that the two unite in the production of a new design of a light fixture. By the word "design" as used in this specification is meant those aggregated features of contour or ornamentation or both, which contribute to the production of a pleasing appearance in an article.

A still further object of the invention is the provision in a wall bracket of an addition in the nature of a flower holder, the design of flower holder and bracket adapted to blend and the flowers to be held in juxtaposition to the fixture in such a way that they will not be injured by the heat but at the same time will present to the observer a pleasing effect produced by the light from the fixture passing through the body of the flowers.

Other objects and advantages of the invention will hereinafter appear in the following description and the novel features will be particularly pointed out in the appended claims.

Like reference characters indicate like parts throughout the several figures and drawings, in which, Fig. 1 is an elevation of the combined fixture and flower holder.

Fig. 2 is a vertical section through the same.

Fig. 3 is a horizontal section taken on the line 3—3 of Fig. 1, and Fig. 4 is a detail of the vase supporting bracket.

While a particular wall bracket has been selected for the purpose of illustration as the light fixture of the combination, and a vase in the nature of an attachment to the bottom of that fixture as the flower holding element of the combination, it will be appreciated that other forms of light fixtures and other forms of flower holders might be effectively used. The gist of the invention is the production of an ornamental combination of light fixture and flower holder and their association in such a way that the design of the fixture blends with that of the flower holder, and the light from the fixture illuminates and blends with the shape, form and color of the flowers in the holder. It is also within the purview of the invention to produce a combination of these elements which would be pleasing to the eye in case the flowers themselves were omitted from the flower holder.

The particular wall bracket selected for the purpose of illustration consists of an electric light socket 10 supported from a wall plate 11 by the neck 12. Depending from the wall plate is the strap 13 terminating in a horizontal supporting ledge 14, to which has been secured by bolts 15 a glass holder 16. The glass holder is shaped to receive two panes of ornamental glass 17 and 18 which lie in intersecting planes so that their rear edges 18' will approach the wall while their front edges will meet at 19 in an angular formation, more clearly disclosed in Fig. 3 of the drawing. The metallic glass holder 16 is of an ornamental shape, having scalloped edges at its base 20 and extending upwardly in an angular form to a point two-thirds of the distance to the top of the glass as shown at 21. The glass panes are irregular in shape and comprise edges made in a combination of curved and straight lines which produces a truly ornamental appearance. And its coloring is such as to add to its attractiveness.

To the light holder just described has been applied, in the nature of an attachment, a metallic cup 22 to which has been riveted a bracket 23, the horizontal leg of which is slotted as at 24 to be slipped upon the contracted portions of the bolts 15 below the shelf 14 of the lamp bracket. For this purpose there has been provided a head 25 on each of the bolts 15.

The metallic cup is made in a shape shown in plan on Fig. 3, and it will be appreciated that this shape has been selected to match or blend with the angular form of the glass holder of the bracket. It will also be ornamented in the same way that the glass holder is ornamented, so that if this cup only were attached to the wall braket there would be an ornamental and pleasing effect and in this condition it might be used in any one of a variety of ways.

However, it is designed to receive a flower vase made of glass 26 and shaped to fit therein at its lower end and at its upper end to present a combination of curved and straight edges to match the edge formation of the glass of the bracket, and the coloring of the glass of this vase is selected with a view to its blending and matching the coloring of the glass of the bracket, not necessarily the same color but one that would complement or add to the ornamental effect produced by the glass of the bracket.

The design of the vase and of the bracket are such that if no flowers were inserted in the vase there would still be a truly ornamental appearance in the combination developed, but it is designed to receive flowers and to hold them in a position in front of the bracket that the light passing through the glass of the bracket and the glass of the vase and around the flowers will produce a truly ornamental effect. To produce the most advantageous results, the color and shape of the flowers must be selected with some care and the coloring of the glass selected with a view to securing the best results with a wide variety of colors of flowers.

From the foregoing description the usefulness of the combined light bracket and flower holder will be apparent. It remains only to set forth the facility with which the vase might be applied to the bracket. The flower holder may not, if so desired, be kept as a permanent part of the fixture but may be used on occasions only. Its removal from the bracket is easily accomplished and it might be stored until another occasion requires its use. In changing flowers this facility of detachment is important, as the cup and vase with the flowers therein can be removed very readily. It is obvious that a flower holder which is securely attached to a wall bracket is less liable to be upset while in use, and that it therefore constitutes a safe place to exhibit flowers, whether in the home or in a public place.

What is claimed is:

1. In a light fixture, the combination of a wall bracket and a flower holder, the holder being mounted in such proximity to the bracket as to appear as a part of the fixture, the design of the holder conforming to that of the bracket, the bracket and holder forming an ornamental wall light fixture in which the designs of the component parts unite in the production of new design fixture.

2. The combination of claim 1 in which the holder is located in a position with respect to the bracket to support flowers in the path of the light rays, and in which means are provided to protect the flowers from the heat of the rays.

3. The combination of claim 1 in which the bracket is provided with a glass shade, and the holder is attached to the bracket and supported in front of said shade.

In testimony whereof I affix my signature.

WILLIAM D. SHOEMAKER.